US010652189B2

(12) United States Patent
Pierce et al.

(10) Patent No.: US 10,652,189 B2
(45) Date of Patent: May 12, 2020

(54) MESSAGE ENCODING AND TRANSMISSION ACROSS MULTIPLE PLATFORMS

(71) Applicant: Chicago Mercantile Exchange Inc., Chicago, IL (US)

(72) Inventors: Carrick John Pierce, New York, NY (US); Baris Mestanogullari, Downers Grove, IL (US); Ajay Kumar Jain, Aurora, IL (US); Agnes Casenave, London (GB); David Bernard Barton, Broxbourne (GB); Nicholas Bandy, London (GB)

(73) Assignee: Chicago Mercantile Exchange Inc., Chicago, IL (US)

( * ) Notice: Subject to any disclaimer, the term of this patent is extended or adjusted under 35 U.S.C. 154(b) by 175 days.

(21) Appl. No.: 15/788,399

(22) Filed: Oct. 19, 2017

(65) Prior Publication Data
US 2019/0124030 A1  Apr. 25, 2019

(51) Int. Cl.
*G06F 15/16* (2006.01)
*H04L 12/58* (2006.01)
(Continued)

(52) U.S. Cl.
CPC .......... *H04L 51/18* (2013.01); *G06Q 40/04* (2013.01); *H04L 51/04* (2013.01); *H04L 63/126* (2013.01); *H04L 51/34* (2013.01)

(58) Field of Classification Search
CPC ......... G06Q 40/04; H04L 51/04; H04L 51/18; H04L 51/34; H04L 63/126
See application file for complete search history.

(56) References Cited

U.S. PATENT DOCUMENTS 5,946,647 A    8/1999  Miller et al.
6,199,100 B1*  3/2001  Filepp ............ C08L 67/025
                                        707/E17.032
(Continued)

OTHER PUBLICATIONS

Bonnie A. Nardi et al., "Collaborative, Programmable Intelligent Agents", Miramontes Interactive, Innovative Information Management: Apple Data Detectors, Mar. 1998, http://www.miramontes.com/writing/add-cacm/index.php.
(Continued)

*Primary Examiner* — Moustafa M Meky
*Assistant Examiner* — Thorne E Waugh
(74) *Attorney, Agent, or Firm* — Lempia Summerfield Katz LLC

(57) ABSTRACT

A data processing system is configured to perform a computer implemented method for facilitation of efficient processing of electronic messages via a network from message sources. The method includes receiving an electronic message including actionable object data and textual object data from a message source device. The actionable object data includes parameters actionable by at least one data processing transaction device to perform data processing transactions external to the network device and the textual object data including descriptors of the parameters actionable by the at least one data processing transaction device. The textual object data is operable by devices incompatible with the actionable object data. The method includes calculating an execution command for the data processing transaction in response to the actionable object data and based on at least the parameters of the actionable object data.

20 Claims, 8 Drawing Sheets

(51) Int. Cl.
  *G06Q 40/04* (2012.01)
  *H04L 29/06* (2006.01)

(56) References Cited

U.S. PATENT DOCUMENTS

| | | | |
|---|---|---|---|
| 7,039,610 B2 | 5/2006 | Morano et al. | |
| 7,424,303 B2 * | 9/2008 | Al-Sarawi | G06Q 20/10 |
| | | | 455/466 |
| 7,774,363 B2 * | 8/2010 | Lim | G06F 21/604 |
| | | | 707/781 |
| 7,831,491 B2 | 11/2010 | Newell et al. | |
| 7,853,499 B2 | 12/2010 | Czupek et al. | |
| 8,023,934 B2 * | 9/2011 | Jeide | H04L 67/2842 |
| | | | 370/350 |
| 8,368,662 B2 * | 2/2013 | Argiro | G06F 3/016 |
| | | | 345/156 |
| 8,639,629 B1 * | 1/2014 | Hoffman | G06Q 20/20 |
| | | | 705/44 |
| 8,768,838 B1 * | 7/2014 | Hoffman | G06Q 40/00 |
| | | | 705/44 |
| 9,311,503 B2 * | 4/2016 | Lim | G06F 21/6218 |
| 2005/0096999 A1 | 5/2005 | Newell et al. | |
| 2005/0203826 A1 | 9/2005 | Farrell et al. | |
| 2006/0026091 A1 * | 2/2006 | Keen, Jr. | G06Q 40/025 |
| | | | 705/37 |
| 2014/0006243 A1 | 1/2014 | Boudreault et al. | |
| 2015/0073962 A1 | 3/2015 | Bixby et al. | |
| 2015/0127516 A1 | 5/2015 | Studnitzer et al. | |
| 2015/0178831 A1 | 6/2015 | Bonig et al. | |
| 2016/0086267 A1 | 3/2016 | Labuszewski et al. | |
| 2016/0182414 A1 | 6/2016 | Mestanogullari | |
| 2017/0004575 A1 | 1/2017 | Repaka | |

OTHER PUBLICATIONS

Daniel Eran Dilger, "How Samsung & Google Teamed up to Steal Apple Data Detectors for Android", appleinsider.com, Apr. 10, 2014, http://appleinsider.com/articles/14/04/10/how-samsung-google-teamed-up-to-steal-apple-data-detectors-for-android.

Francesco Schiavon, "5 Super Useful Tips for Mac OS X Mail: What are Data Detectors Anyway?", macProVideo.com, Jun. 14, 2014, https://www.macprovideo.com/hub/mac-osx/5-super-useful-tips-for-mac-os-x-mail-what-are-data-detectors-anyway.

Extended European Search Report, from EP Application No. 18200786, dated Mar. 4, 2019, EP.

* cited by examiner

FIG. 7

MESSAGE ENCODING AND TRANSMISSION ACROSS MULTIPLE PLATFORMS

FIELD

The following embodiments relate to message encoding and transmission through multiple platforms including at least one platform for performing actions based on the message and at least one platform for displaying text related to the message and/or forwarding the message to other platforms.

BACKGROUND

A data transaction processing system receives electronic data transaction request messages specifying transactions to be performed. Incoming messages may include requests for transactions which are triggered by, or otherwise perform actions on, the data objects at specified values. Whether or not the attempted actions are executed or performed depend in part on the values submitted with the incoming messages and/or the rules and processing routines programmed into a data transaction processing system.

One example of an environment including data objects having specified values is an electronic trading system wherein the values may be submitted by participants, e.g. traders. A variety of trading systems, communication systems, and operating systems within the environment may hinder the exchange of data objects through the environment. Some systems may not be configured for processing certain types of data objects. Others would be able to process portions of the data object but are not compatible with the data objects and cannot parse them for the compatible data. The following embodiments meet these challenges in an improved data transaction processing system.

BRIEF DESCRIPTION OF THE DRAWINGS

FIG. 7 depicts an illustrative embodiment of data object control in the communication window of FIG. 5.

DETAILED DESCRIPTION

Figure 1:
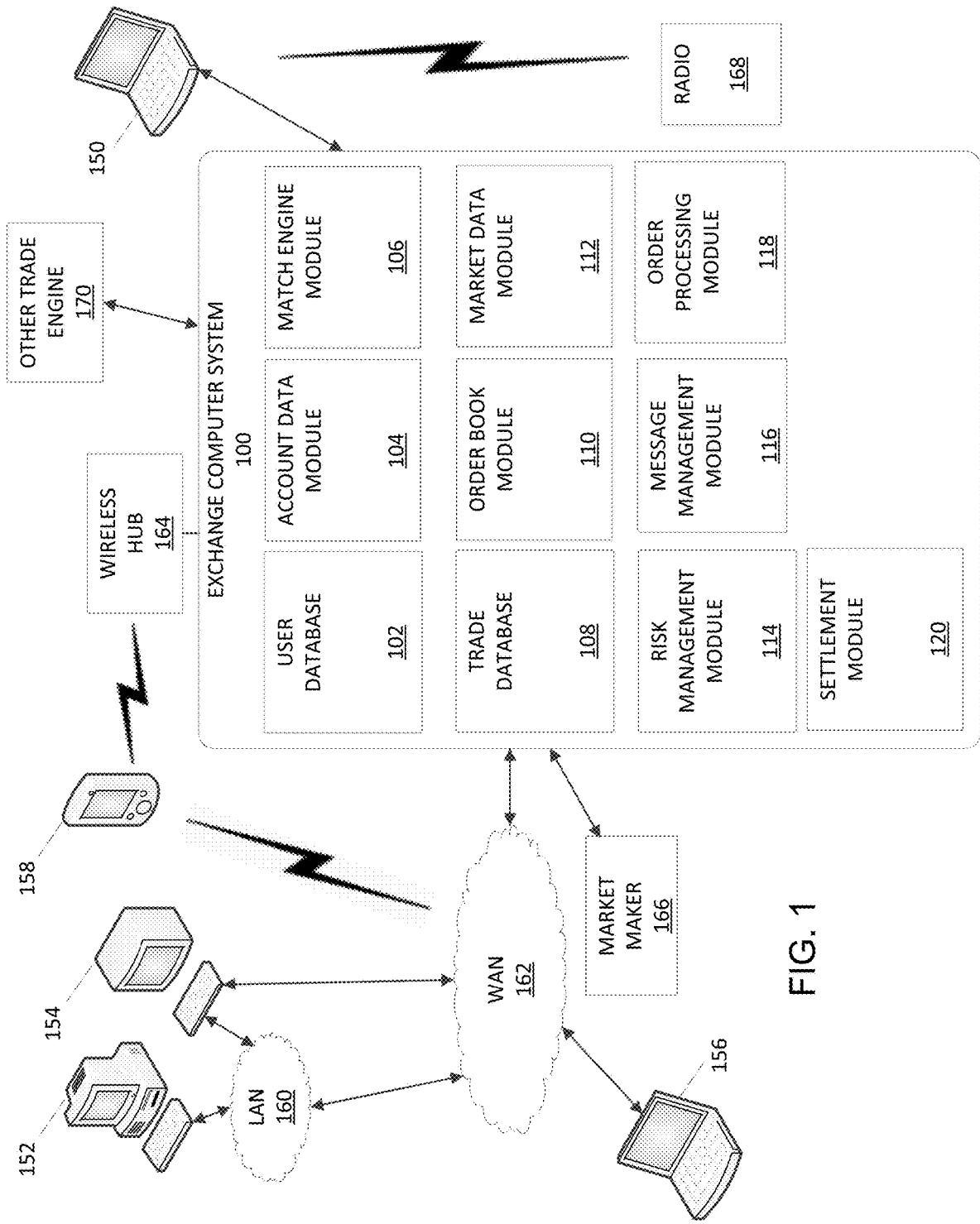
FIG. 1 depicts an illustrative computer network system that may be used to implement aspects of the disclosed embodiments.

The disclosed embodiments relate generally to a data processing system or instant messaging system that processing electronic messages or instant messages including at least two portions. The messages are versatile messages that include an actionable portion (e.g., electronic data transaction request message) including actionable object data and a textual portion (e.g., instant message) including textual object data. The textual object data may include any type of text including personal messages sent from user to user. The textual object data may be a quasi-instructional request such as "please place the attached order" or a personal message that is independent of the actionable object data such as "hi, how is the family?" A variety of devices or platforms may receive the messages in the same form and process the messages differently. Some devices or platforms may initiate one or more exchange functions in response to the messages. Some devices or platforms may actively display and/or request user input in response to the messages. Some devices or platforms may passively transmit the messages (i.e., send the messages from one device to the next). The platforms may include an end user platform for the devices used by the instant messaging participants and capable of generating the actionable object data, a networking platform used by the communication devices and capable of forwarding or displaying data indicative of the actionable object data, and an exchange platform using to perform the transactions described by the actionable object data.

The functions for the exchange platform may include orders or transactions to implement a strategy. For example, when the data processing system is implemented within a financial exchange computing system, the users may be traders who submit orders to buy or sell financial instruments at specific values. Trader strategies may rapidly vary with the state of an electronic marketplace, and may accordingly necessitate submission of many additional electronic messages, which may be related to previously submitted electronic messages.

The versatile messages improve the data processing system by making the system more efficient. The versatile messages improve the data processing system by reducing the number of hardware and/or software components. Because a single message may include actionable object data and textual object data, the single message replaces an actionable messaging system and a text messaging system. Fewer messaging systems means reduced the computational resources (e.g., processors, memory, communication circuitry, or other hardware). Because a single message is used rather than dual messaging systems, fewer messages are used, which also reduces the computational resources (e.g., processors, memory, communication circuitry, or other hardware) and specifically, reduces the bandwidth requirements between devices in the system.

The versatile messages improve the data processing system by improving the efficiency of the user operation. Because a single message may include actionable object data and textual object data, the user is not required to switch between an actionable messaging system and a text messaging system, which saves time for the user. The user does not switch between interfaces of different systems and/or spend time generating messages in both systems.

The disclosed embodiments also improve upon the technical field of networking by integrating the actionable messaging system with the text messaging system. The disclosed embodiments also improve on the field of data processing by reducing the hardware components required for instant messages. The disclosed system is a specific implementation and practical application of a hardware based device that coordinates the control of electronic messages among multiple platforms.

The disclosed embodiments may be directed to an exchange computing system that includes multiple hardware matching processors that match, or attempt to match, electronic data transaction request messages or actionable object data with other electronic data transaction request messages counter thereto.

Incoming electronic data transaction request messages may be received from different client computers over a data communication network, and output electronic data transaction result messages may be transmitted to the client computers and may be indicative of results of the attempts to match incoming electronic data transaction request messages.

The disclosed embodiments may be implemented in a data transaction processing system that processes data items or objects. Some devices in the data transaction processing system may be configured to perform transactions in responses to certain data objects, and other devices in the data transaction processing system display data included in the data objects. Other devices may merely forward the data objects. Customer or user devices (e.g., computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing, and report this information to data recipient computing systems via outbound messages published via one or more data feeds. For example, one exemplary environment where the disclosed embodiments may be desirable is in financial markets, and in particular, electronic financial exchanges, such as a futures exchange, such as the Chicago Mercantile Exchange Inc. (CME).

The data processing system may include a network of network devices. A network device receives an electronic message including actionable object data and textual object data from a message source device. The actionable object data includes one or more parameters actionable by at least one exchange device. The textual object data includes one or more descriptors of the one or more parameters actionable by the at least one exchange device. The textual object data is operable by devices incompatible with the actionable object data. The network device is configured to calculate an execution command in response to the actionable object data. The execution command is based on at least the one or more parameters of the actionable object data. The network device is also configured to send a data transaction request message including the execution command to the at least one exchange device and to send data for display based on the textual object data including the one or more descriptors of the one or more parameters actionable by the exchange device to a display device other than the at least one exchange device.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

The disclosed embodiments recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market. The electronic message may include a textual portion that operates independently or dependently from the associated specific action to be undertaken by the electronic trading system. When the textual portion is dependent on the associated specific action, the textual portion may describe the action (e.g., describe the new trade order in one or more of price, quantity, ticker, or strategy). When the textual portion is independent from the associated specific action, the textual portion may include a supporting information for the associated specific action (e.g., party name, account name, time of the order) or conversational information (e.g., salutation or personal messages) from the market participant or another user.

As used herein, an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in an acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a transmission control protocol (TCP) acknowledgment which acknowledges receipt of the shallow acknowledgment and token.

Electronic messages communicated to the electronic trading system, also referred to as "inbound" messages, may include associated actions that characterize the messages, such as trader orders, order modifications, order cancellations and the like, as well as other message types. Inbound messages may be sent from market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one exemplary embodiment, the incoming request itself, e.g., the inbound order entry, may be referred to as an iLink message. iLink is a bidirectional communications/message protocol/message format implemented by the Chicago Mercantile Exchange Inc.

Electronic messages communicated from the electronic trading system, referred to as "outbound" messages, may include messages responsive to inbound messages, such as confirmation messages, or other messages such as market update messages, quote messages, and the like. Outbound messages may be disseminated via data feeds.

Electronic messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
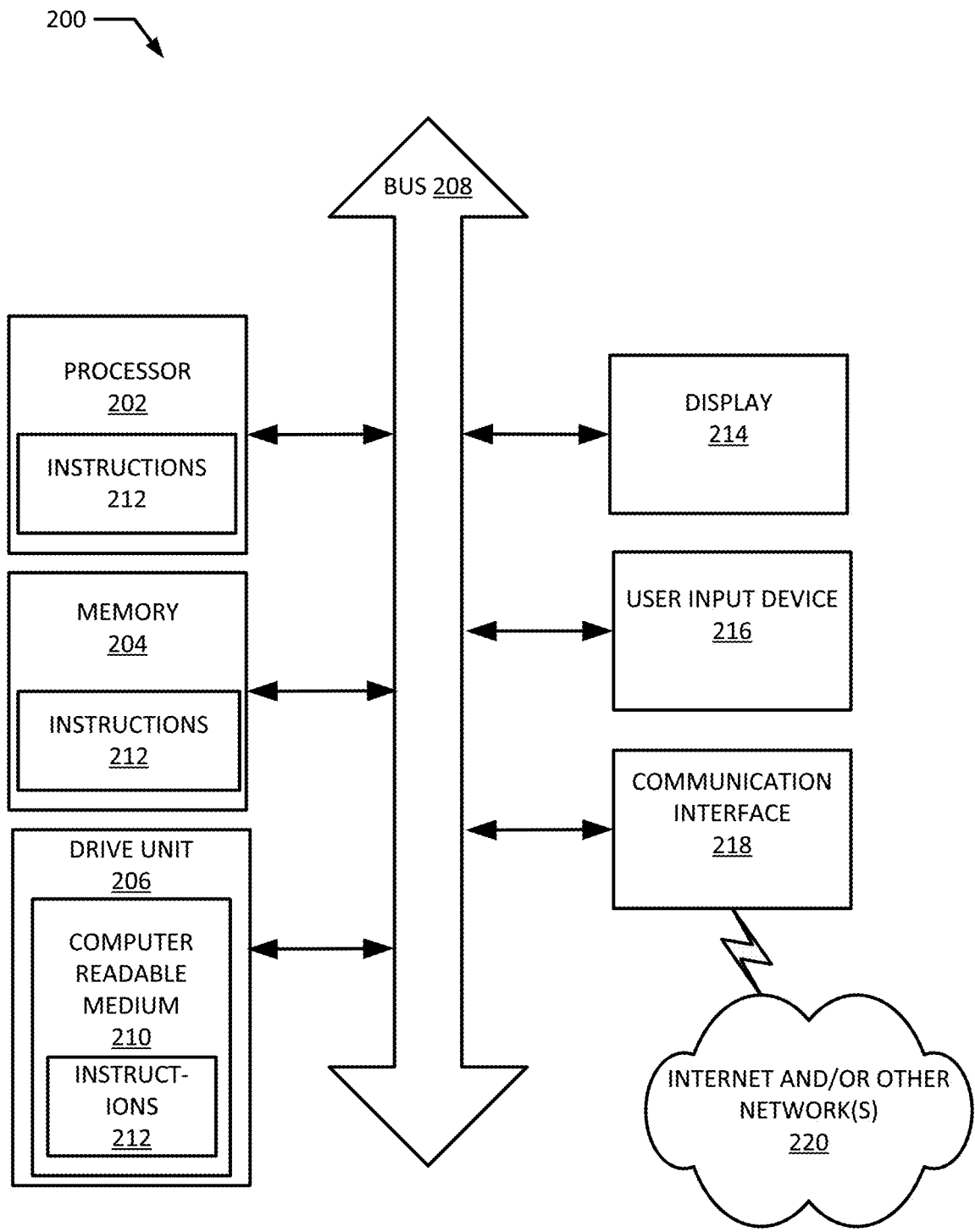
FIG. 2 depicts an illustrative embodiment of a general computer system for use with the disclosed embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market. A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, instant messages or electronic messages including a text portion and an electronic data transaction portion. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message.

Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a computer system 200 is shown, which may be embodied in the exchange computer system 100. The computer system 200 can include a set of instructions that can be executed to cause the computer system 200 to perform any one or more of the methods or computer based functions disclosed herein. The computer system 200 may operate as a stand-alone device or may be connected, e.g., using a network, to other computer systems or peripheral devices. Any of the components discussed herein, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly. The communication interface 218 may be configured to receive an electronic message including actionable object data and textual object data from a message source device. The actionable object data includes one or more parameters actionable by at least one data processing transaction device (e.g., exchange device) to perform one or more data processing transactions external to the network device and the textual object data including one or more descriptors of the one or more parameters actionable by the at least one data processing transaction device. The textual object data is operable by both devices incompatible and compatible with the actionable object data;

The processor 208 may be configured to calculate an execution command for the data processing transaction in response to the actionable object data. The execution command is based on at least the one or more parameters of the actionable object data. The processor 208 may be configured to generate a data transaction request message including the execution command to the at least one data processing transaction device. The processor 208 may be configured to generate data for display on display 218 based on the textual object data including the one or more descriptors of the one or more parameters actionable by the data processing transaction device to a display device other than the at least one data processing transaction device.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 3:
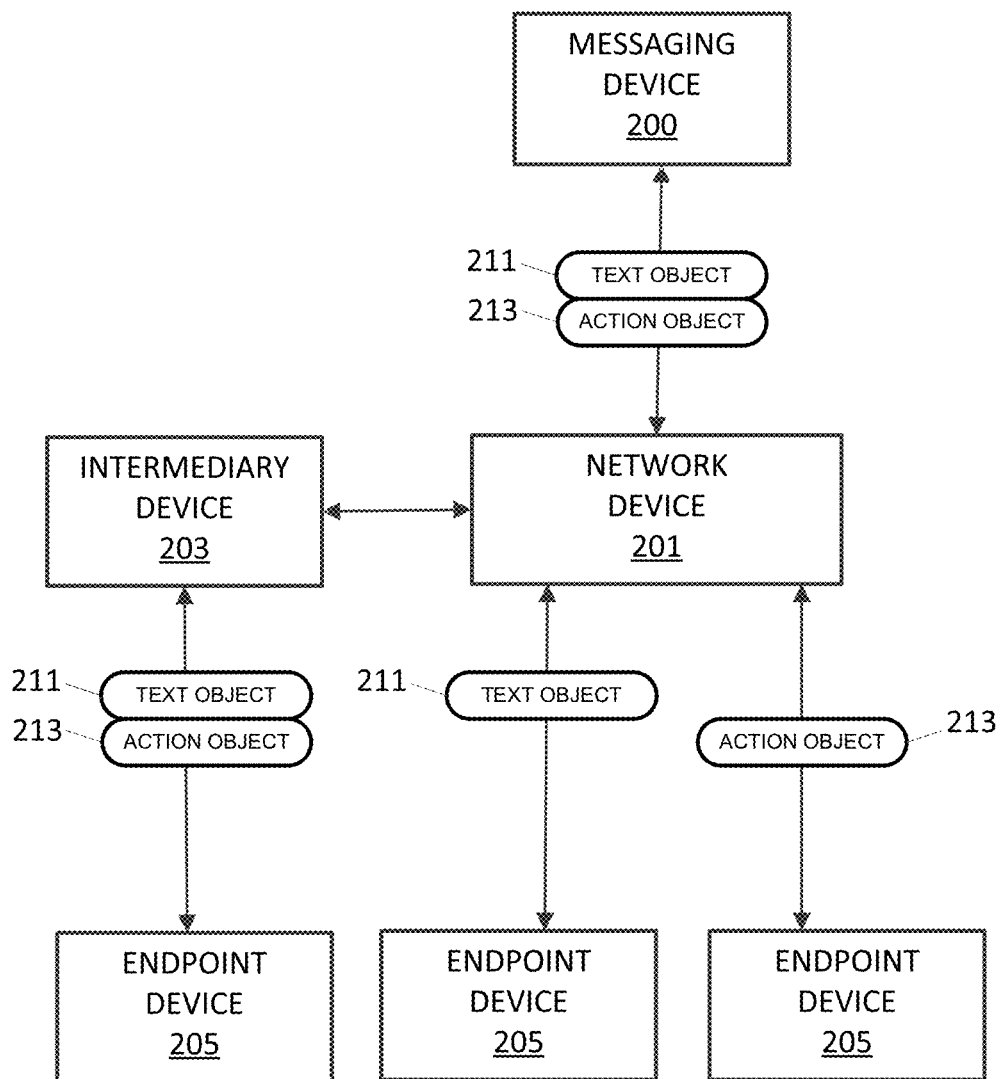
FIG. 3 depicts an illustrative embodiment of a communication system to implement aspects of the disclosed embodiments.

FIG. 3 illustrates a communication system to implement aspects of the disclosed embodiments. The computer system of FIG. 2, which may be a messaging device 200, is coupled with the communication system for communication with a network device 201 and an intermediary device 203. The messaging device 200 may be directly coupled with the network device 201 and indirectly coupled with the intermediary device 203 by way of the network device 201. One or more endpoint device 205 are also coupled with the communication system for communication with the network device 201 and the intermediary device 203. Additional, different or fewer components may be included.

The network device 201 may be the exchange computer system 100 including a processor (e.g., processor 202) for analyzing and forwarding data packets. The network device 201, using processor 202, is configured to receive, through the network, data packets forming an electronic message. The electronic message may be encoded in one or more of the data packets. The network device 201 may identify the recipients of the electronic message and modify the electronic message according to the recipients.

The messaging device 200 and/or endpoint device 205 may be a user device including one or more displays and user input devices for entering user commands. For example, computer devices 150, 152, 154, 156 and 158 may be used for the messaging device 200 and/or endpoint device 205.

The messaging device 200 may generate an electronic message including an actionable portion (e.g., action object 213) including actionable object data and a textual portion (e.g., text object 211). The messaging device 200 may provide a messaging interface to the user. The messaging interface may include a textual input portion where the user enters text to form the textual portion included in the text object 211. The messaging interface may include an actionable object portion for generating the action object 213. The messaging device 200 may insert an identification in the instant message (e.g., in the header) that identifies the messaging device 200 and the origin or sender of the instant message.

The text object 211 may have a dependent relationship with the action object 213 or the text object 211 may have an independent relationship with the action object 213. The independent relationship means that the text object 211 is not dependent on the contents of the action object 213 (e.g., the text object 211 is entirely text entered by the user). The contents of the independent message may be any alphanumeric characters entered by the user, which may be referred to as freeform text or freeform words. The dependent relationship means that the text object 211 includes text based on the contents of the action object 213 (e.g., one or more parameters of the action object 213 are described in the text object 211). The text object 211 may include text for all parameters of the action object 213. The textual object data of the text object 211 may include one or more descriptors of the one or more parameters actionable by the at least one data processing transaction device. The text object 211 is operable by devices incompatible with the actionable object data.

In one example, the actionable object portion includes one or more user input mechanisms for defining parameters of the action object 213. The user input mechanisms may include a slide, drop down menu, or input field. The parameters may include a quantity parameter, a price parameter, an instrument name parameter, a strategy parameter, a timing parameter, an allocation parameter, or another parameter. The quantity parameter may define a quantity of an order for the action object 213. The price parameter may define a price of an order for the action object 213. The actionable object data in the action object 213 includes one or more parameters actionable by at least one data processing transaction device to perform one or more data processing transactions external to the network device 201. The time parameter may define a time range for filling an order for the action object 213. The allocation parameter may define an allocation algorithm for an order for the action object 213. Example allocation algorithms are described herein and include first-in first-out algorithm, a pro-rata algorithm, or a combination thereof.

The instrument name parameter may define the name of a financial instrument for the order for the action object 213. The instrument name may specify a type of instrument (e.g., options, futures, stocks, bonds, or another instrument). The strategy parameter may define a strategy of an order for the action object 213. The strategy is a combination contract and may be made of multiple orders for outright contracts where each order for an outright contract forms a "leg" of the strategy, also referred to as a leg order. The definition of the combination contract further specifies whether buying a unit quantity of the strategy, i.e. the combination contract, requires a given leg to be bought or sold and in what quantity. Example strategies include spreads such as bear spreads, bull spreads, butterfly spreads, calendar spreads and user defined spreads. A bear spread is a vertical spread involving the sale of the lower strike call and the purchase of the higher strike call, called a bear call spread. Also, a vertical spread involving the sale of the lower strike put and the purchase of the higher strike put, called a bear put spread. A bull spread is a vertical spread involving the purchase of the lower strike call and the sale of the higher strike call, called a bull call spread. Also, a vertical spread involving the purchase of the lower strike put and the sale of the higher strike put, called a bull put spread. Butterfly spreads can be futures or options spreads. As an option spread, a butterfly spread is a strategy combining a bull and bear spread and uses three strike prices.

The network device 201 may analyze the electronic message to determine whether the electronic message includes the action object 213, the text object 211, or both the action object 213 and the text object 211. The electronic message may include a header a schema identifier that defines the contents of the electronic message. The schema identifier may include a flag for action object 213 and a flag for the text object 211. The network device 201 may extract any flags included in the electronic message and determine the existence of the action object 213 and/or the text object 211.

The network device 201 may generate and store a capabilities matrix to define the capabilities of the endpoint devices 205. Some endpoint devices 205 are configured to perform the actions described by the action object 213. Some endpoint devices 205 are configured to translate the action object 213 to an icon or other displayed illustration. Some endpoint devices 205 are configured to display the text object 211 and only pass through the action object 213. The capabilities matrix may associate each of these categories of capabilities with each of endpoint devices 205. For example, the capabilities matrix may include a data element for a pairwise combination of each one of the endpoint devices 205 and each of the categories of capabilities.

In response to receiving the electronic message, the network device 201 may access the capabilities matrix based on the electronic message. In one example, the network device 201 reads a recipient identifier from the electronic message that corresponds to one of the endpoint devices 205. The network device 201 applies the recipient identifier from the electronic message to the capabilities matrix to select the capabilities of the corresponding endpoint device 205. Depending on whether the capabilities matrix indicates that an endpoint device is compatible with the action object 213, compatible with the text object 211 or both the action object 213 and the text object 211, the network device 201 may send the corresponding data to the endpoint device 205.

The network device 201 may execute the action object 213. The network device 201 may calculate an execution command for the data processing transaction in response to the actionable object data. The execution command may be based on at least one or more parameters of the actionable object data. The execution command may cause a transaction to be performed by the network device 201. The execute command may cause the network device 201 to send a data transaction request message including the execution command to the at least one data processing transaction device (e.g., endpoint device 205).

For example, in response to receiving the electronic message, the network device 201 may forward the electronic message to all of the connected endpoint devices 205. In this case, the network device 201 may also access the capabilities matrix based on the electronic message to determine the capabilities of each of the connected endpoint devices 205. Depending on whether the capabilities matrix indicates that an endpoint device is compatible with the action object 213, compatible with the text object 211 or both the action object 213 and the text object 211, the network device 201 may send the corresponding data to the endpoint device 205. The action object 213 may be executed by the endpoint device 205.

The action object 213 may instruct the endpoint device to perform a transaction in response to the electronic message. The transaction may include placing an order for an instrument, filling an order for a financial instrument, or requesting a quote for an instrument. The action object 213 may include instructions or code for an algorithm that performs the transaction at the endpoint device 205 or an exchange device. For example, the transaction may include sending a command to another exchange device in response to the action object 213.

In one alternative, the action object 213 may be replaced by a semi-actionable object. The semi-actionable object does not include instructions for any transactions at the endpoint device or the exchange device. Rather, the semi-actionable object instructs the endpoint device to identify a type of financial instrument or strategy comprising multiple types of financial instruments. The semi-actionable may include structured text that defines the parameters of the financial instrument or strategy including multiple financial instruments. In response to the semi-actionable object, the endpoint device may display the text object 211 as well as prompt the user of the endpoint device for input in response to the semi-actionable object.

The network device 201 may display the text object 211. For example, the network device 201 may send data for display based on the textual object data including the one or more descriptors of the one or more parameters actionable by the data processing transaction device to a display device other than the at least one data processing transaction device. The text object 211 may be displayed or forwarded by the endpoint device 205. The text object 211 may include a textual description of the transaction performed in response to the action object 213. The text object 211 may be in a standard formation such as American Standard Code for Information Interchange (ASCII), ANSI formation, or plain text.

The network device 201 may extract the identification code from the electronic message that is indicative of the messaging device 200. The network device 201 may display the identity of the messaging device 200 in response to the identification code. The network device 201 may determine whether or not to execute the action object 213 based on the identification code. The network device 201 may determine whether or not to display the text object 211 based on the identification code. The network device 201 may determine where to forward the instant message based on the identification code. For example, the network device 201 may select the data processing transaction device, or endpoint device 205, in response to the identification code. In any of these examples, the network device 201 may compare the identification code to a list or a lookup table to determine how to handle the instant message.

In one implementation, the identification code for the messaging device 200 is based on an address (e.g., IP address) of the messaging device 200. The network device 201 may generate a receipt message or acknowledgment message in response to the electronic message and the identification code. The network device 201 may send the receipt message to the messaging device 200 device based on the identification code. The receipt message may include data indicative of the at least one data processing transaction device, or endpoint 205, in response to the electronic message being sent to the at least one data processing transaction device, or endpoint 205. The receipt message includes data indicative of the at least one display device in response to the electronic message being sent to the display device.

The intermediary device 203 may be an external device for implementing security or performing a certification between the communication system and an external system. To implement security, the intermediary device 203 may perform a certification process on the electronic message. The certification may verify that the sender of the electronic message.

To implement certification, the intermediary device 203 may compare the sender of the electronic message to a list of certified devices. The sender may be represented by IP address and the list of certified devices may be a list of IP addresses. The sender may be represented by domain name and the list of certified devices may be a list of domain names. The sender may be represented by username and the list of certified devices may be a list of user names. The sender may be represented by a trader identification number and the list of certified devices may be a list of a trader identification numbers.

To implement security, the intermediary device 203 may test the electronic message for malicious data. In the action object 213, the malicious data may be a virus, a malicious code, or malware. In the text object 211, the electronic message may include a link to the malicious data.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein utilize trade related electronic messages or instant messages that may include mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of officials related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other orders counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancellation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question.

The other or secondary action may also be considered a modification of a first action executed with respect to an order. For example, a cancellation may be considered a cancellation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118, and used for determining MQI scores of market participants.

Figure 4:
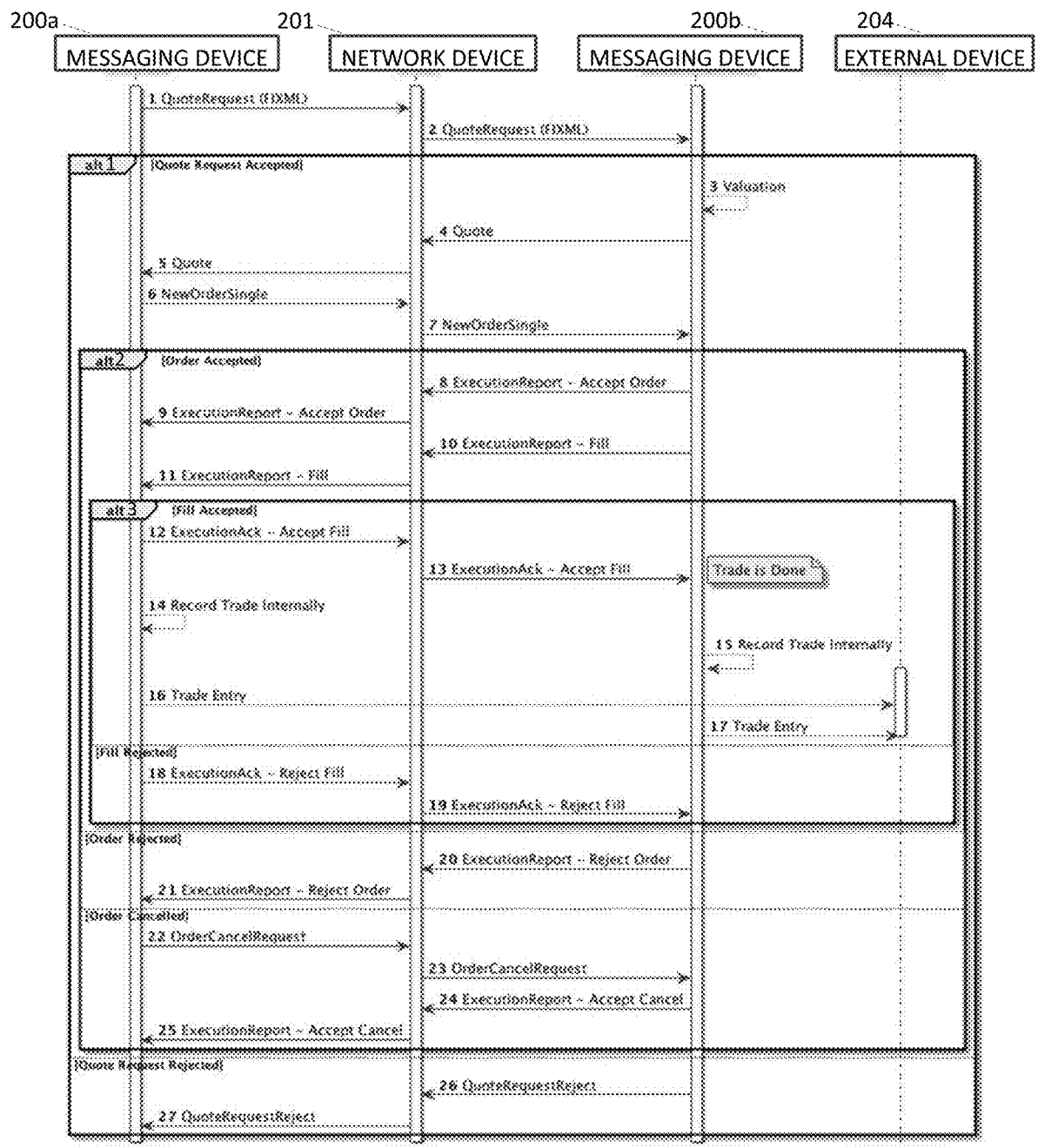
FIG. 4 depicts an illustrative embodiment of a control sequence diagram to implement aspects of the disclosed embodiments.

FIG. 4 depicts an illustrative embodiment of a control sequence diagram to implement aspects of the disclosed embodiments. Each alternative box, Alt1, Alt2, Alt3, Alt4, includes alternative portions of the control sequence diagram. The control sequence diagram may progress in numerical order, for example, from Act 1 to Act 20. However, the control sequence may follow another sequence shown by the alternative boxes. Alt1 illustrates that instead of Acts 3-7 when the quote request is accepted, Acts 26 and 27 may be performed when the quote request is rejection. Alt2 illustrates that instead of Acts 8-11 when the order is accepted, Acts 20 and 21 may be performed when the order is rejected and/or Acts 22-25 may be performed when the order is cancelled. Alt3 illustrates that instead of Acts 12-17 when the fill is accepted, Acts 18 and 19 may be performed when the fill is rejected. Additional, different, or fewer acts may be performed.

The control sequence diagram illustrates communication between an example messaging system 200a such as a trader computer, a network device 201 such as an exchange computer, a messaging system 200b such as a market maker computer, and an external device 204. The control sequence diagram illustrates electronic messages having the text object 211 and the action object 213.

At Act 1, the messaging system 200a generates an electronic message including a quote request and sends the electronic message to network device 201. The electronic message includes a text object 211 that describes at least one parameter of the quote request in text. In one example, the at least one parameter may be only the underlying instrument, which corresponds to a market quote. In another example, the at least one parameter may include a quantity and a type. Examples types include quote request for a buy order, quote request for a sell order, quote request for a sell order, quote request for a short sell, quote request for a cross order in which the exchange is a party, and a collateral direction order. The text object 211 may include additional instant message text including any type of message from user to user. The instant message text may include freeform text which is any type of alphanumeric characters entered by the user of the messaging system 200*a*. The instant message text may be forwarded across all of the Acts 1-27. In one example, the action object 213 of the electronic message is modified from one act to the next or one device to the next, while the text object 211 carries the instant message text from act to act or user to user. In another example, different electronic message are generated at the different acts described and the instant message text is carried through between electronic messages.

The electronic message for the quote request includes an action object 213 that includes an automated command or script for executing the request for quote. The command or script may include the at least one parameter. In some examples, the action object 213 may include one or more commands or a script using FIXML. The network device 201 may execute the action object 213 to send the electronic message to the messaging device 200*b*, which may be a market maker computer. Act at 2, the market maker computer may execute the action object 213 to fulfill or respond to the quote request.

At Act 3, the messaging device 200*b* performs a valuation in order to respond to the quote request. The messaging device 200*b* may access data for the valuation from an external service.

At Act 4, the quote is returned from the messaging device 200*b* to the network device 201. The quote may be implemented by an electronic message including the text object 211 and the action object 213. In addition, to the at least one parameter of the quote request in text, the text object 211 may include text that indicates that the quote request has been fulfilled. At Act 5, the quote is returned from the network device 201 to the messaging device 200*a*. The communication may be initiated through execution of the action object 213.

At Act 6, an electronic message including a new order is generated at the messaging device 200*a* in response to the electronic message for the quote. The electronic message is transmitted from the messaging device 200*a* to the network device 201. The order may include at least one parameter such as underlying instrument, quantity, order type, allocation type, and a transaction time. The transaction time may describe when the order request was initiated/released by the trader or trading system. The allocation type describes one or more allocation techniques.

At Act 7, the electronic message is forwarded from the network device 201 to the messaging device 200*b*. The network device 201 may execute the action object 213, which causes the electronic message to be forwarded.

In Acts 8-9, the order is accepted. At Act 8, the messaging device 200*b* generates an electronic message including an execution report for acceptance of the order. The messaging device 200*b* may receive a user input indicative of acceptance of the order. The action object 213 of the electronic message received from the network device 201, and optionally the user input indicative of the acceptance of the order, may cause the generation for the execution report for the acceptance of the order.

The execution report includes data to confirm the receipt of an order or changes to the order, if applicable, data to relay order status information, data to relay fill information on working orders, or report post-trade fees calculations associated with a trade. The electronic message is sent from the messaging device 200*b* to the network device 201.

At Act 9, the electronic message including the execution report is sent from the network device 201 to the messaging device 200*a*. The network device 201 may execute the action object 213 to forward the electronic message to the messaging device 200*a* or generate another electronic message to send to the messaging device 200*a*.

At Act 10, the electronic message including an execution report for filling the order, which may be referred to as a fill report. The fill report may be combined with the execution report of Acts 8 and 9. The action object 213 of the electronic message received from the network device 201 may cause the generation for the fill report. At Act 11, the electronic message including the fill report is sent from the network device 201 to the messaging device 200*a*. The network device 201 may execute the action object 213 to forward the electronic message to the messaging device 200*a* or generate another electronic message to send to the messaging device 200*a*.

At Acts 12-17 the fill is accepted. At Act 12, the messaging device 200*a* may generate an electronic message, or modify the received electronic message from Act 11, that is an execution acknowledgment that the fill is accepted. The messaging device 200*a* may receive a user input indicative of acceptance of the fill. The action object 213 of the electronic message received from the network device 201, and optionally the user input indicative of the acceptance of the order, may cause the generation for the execution acknowledgment. The text object 211 may include text that indicates that the fill is accepted.

At Act 13, the electronic message including the execution acknowledgment is forwarded from the network device 201 to the messaging device 200*b*. The network device 201 may execute the action object 213, which causes the electronic message including the execution acknowledgment to be forwarded. When the electronic message including the execution acknowledgment is received at the messaging device 200*b*, the transaction is complete or the trade is done.

At Acts 14 and 15, the transaction is recorded by the messaging device. In Act 14, the messaging device 200*a* may store in memory a record of the transaction. The messaging device 200*a* may execute the action object 213 in Act 12 to initiate storing the terms in the text object 211 in memory at the messaging device 200*a*. In Act 15, the messaging device 200*b* may store in memory a record of the transaction. The messaging device 200*b* may execute the action object 213 in Act 13 to initiating storing the terms in the text object 211 in memory at the messaging device 200*b*.

At Acts 16 and 17, an electronic message including a trade entry record for the transaction is sent to the external device 204. The external device 204 may be a clearing house as described herein. The electronic message may include an action object 213 that instructs the external device 204 to perform one or more clearing services such as settlement or margining. The electronic message may include a text object 211 that includes the parameters, parties, and timing of the transaction. At Act 16, the messaging device 200*a* may execute the action object 213 in Act 12 to initiate the trade entry record and sending the trade entry record to the external device 204. At Act 17, the messaging device 200b may execute the action object 213 in Act 13 to initiate the trade entry record and sending the trade entry record to the external device 204.

Alternatively, in Acts 18 and 19, the fill is not accepted (rejected). At Act 18, the messaging device 200a may generate an electronic message, or modify the received electronic message from Act 11, that is an execution acknowledgment that the fill is rejected. The messaging device 200a may receive a user input indicative of rejection of the fill. The action object 213 of the electronic message received from the network device 201, and optionally the user input indicative of the rejection of the order, may cause the generation for the execution acknowledgment. The text object 211 may include text that indicates that the fill is rejected.

At Act 19, the electronic message including the execution acknowledgment is forwarded from the network device 201 to the messaging device 200b. The network device 201 may execute the action object 213, which causes the electronic message including the execution acknowledgment to be forwarded.

As an alternative to Acts 8-11, in Acts 20 and 21, the order in the action object 213 in the electronic message from Act 7 is accepted. At Act 20, the messaging device 200b generates an electronic message including an execution report for rejection of the order. The messaging device 200b may receive a user input indicative of rejection of the order. The action object 213 of the electronic message received from the network device 201, and optionally the user input indicative of the rejection of the order, may cause the generation for the execution report for the rejection of the order.

The execution report includes data to confirm the receipt of an order or changes to the order, if applicable, data to relay order status information, data to relay fill information on working orders, or report post-trade fees calculations associated with a trade. The electronic message is sent from the messaging device 200b to the network device 201.

At Act 21, the electronic message including the execution report is sent from the network device 201 to the messaging device 200a. The network device 201 may execute the action object 213 to forward the electronic message to the messaging device 200a or generate another electronic message to send to the messaging device 200a.

At Acts 22-25, in addition or alternative to the rejection of the order, the order may also be ended by a cancellation of the order. At Act 22, an electronic message including a cancellation of the new order is generated at the messaging device 200a in response to a user input indicative of cancelling the order at the messaging device 200a. The electronic message is transmitted from the messaging device 200a to the network device 201. The order may include a text object 211 indicative of cancellation of the order and an action object 213 executable to cause forwarding the electronic message when executed by the network device 201 as well as cancellation of the order when executed by the messaging device 200b.

At Act 23, the electronic message is forwarded from the network device 201 to the messaging device 200b. The network device 201 may execute the action object 213, which causes the electronic message to be forwarded. At Act 24, the messaging device 200b executed the action object 213 cancel the order and generates an electronic message including an execution report for cancellation of the order. At Act 25, the electronic message including the execution report is sent from the network device 201 to the messaging device 200a. The network device 201 may execute the action object 213 to forward the electronic message to the messaging device 200a or generate another electronic message to send to the messaging device 200a.

As an alternative to Acts 4-7 when the quote request is accepted, Acts 26 and 27 illustrate a scenario in which the quote request is not accepted (rejected). At Act 26, an electronic message including a quote request rejection is returned from the messaging device 200b to the network device 201. The rejection may be implemented by an electronic message including the text object 211 and the action object 213. The text object 211 may include an identifier for the quote request and an indication of rejection. In addition to the at least one parameter of the quote request in text, the text object 211 may include text that indicates that the quote request has been rejected. The action object 213 may be executable by the network device 201 to forward the electronic message, executable by the messaging device 200a to mark the quote request as rejected. At Act 27, the electronic message including the quote rejection is returned from the network device 201 to the messaging device 200a. The communication may be initiated through execution of the action object 213.

As an alternative to the action object 213, a structured component or embedded may be paired with the text object 211 to form the instant message. The structured component may be embedded in any time of message described above including a request for quote, a security definition, an execution report, a trade capture report, or a new strategy. The structured component may be a script. The structured component may include elements of a script language such as HTML. By embedding an HTML element within the chat message identifying the structure, and then sending the structured message as a separate independent or embedded message, as well as a text object 211 description of the structure, it is possible to provide a chat message that can be used over both text only and structured text enabled chat clients in order to represent the various phases of the negotiation. An example embedded message in HTML may include the following inserted into the chat message: <cmed-data class="{class}"href="cmed:{index}"data="{data}">{Display Text}></cmed-data>. The attributes of the HTML may include class, href, data, and display text. The class attribute may be a value indicating what kind of market data/even this structure represents, this would be one of the supported structured messages: RFQ, security definition, execution report, trade capture report, or new order multi-leg. The href attribute may be a cross reference indicating which associated FIXML structure is referenced. The data attribute is an optional data field identifying the contract that is to be traded (e.g., a code utilized by external device 204 or a clearing house). The display text may define text that is displayed in the text form of the message. By passing this chat message in a combination of formats, the message that arrives in different kinds of chat clients can then be used algorithmically to perform a variety of actions without there being any risk of misunderstanding between the different systems.

The messaging system 200b may correspond to a market maker or a market maker computer. Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Figure 5:
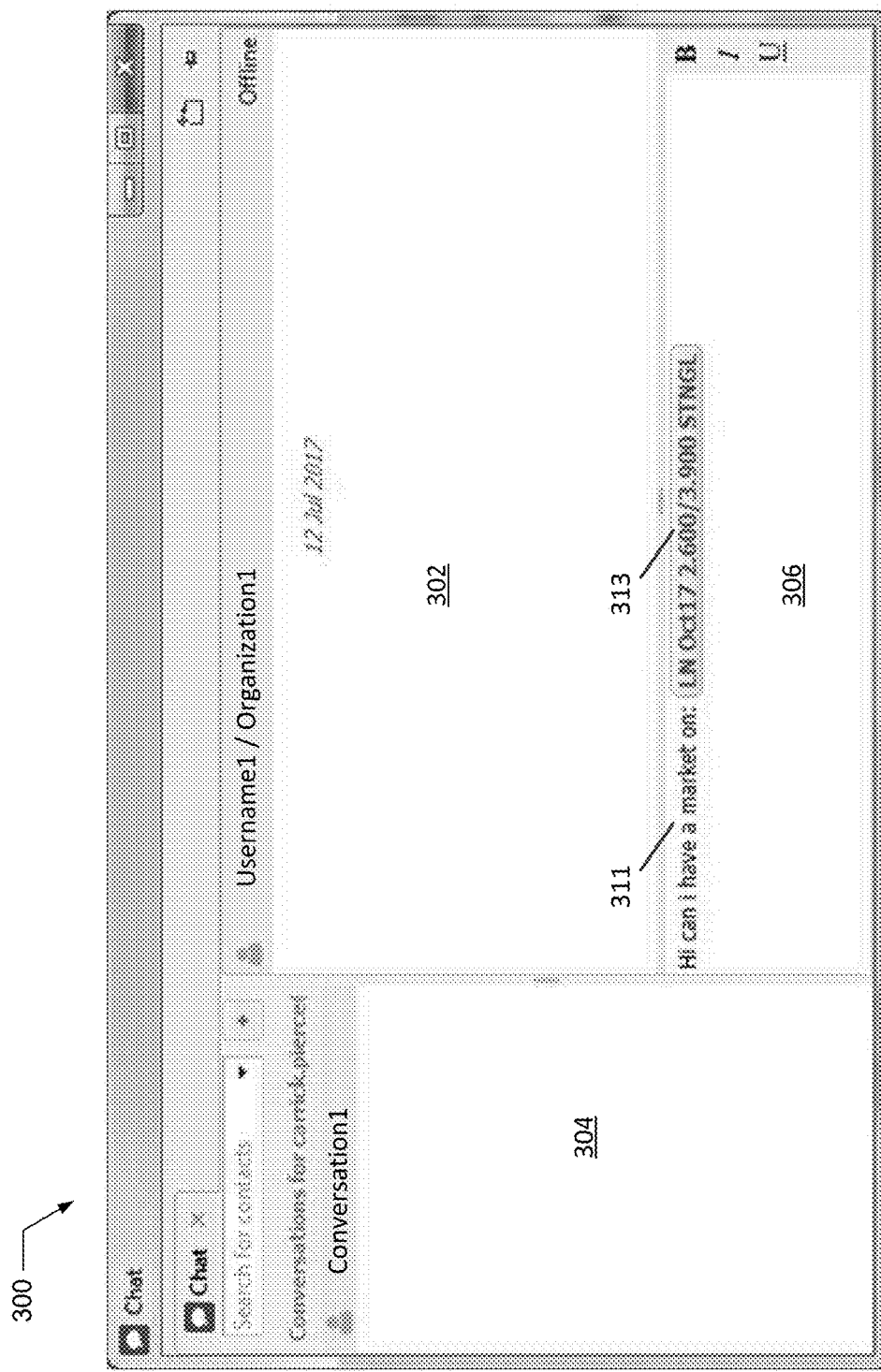
FIG. 5 depicts an illustrative embodiment of a communication window for one or more of the devices in the communication system of FIG. 3.

FIG. 5 depicts an illustrative embodiment of a communication window or versatile message user interface 300 for one or more of the devices in the communication system of FIG. 3. The versatile message user interface 300 may be displayed on the messaging device 200 or the endpoint device 205. The user interface 300 includes multiple panes or portions including a contact pane 302, a conversation pane 304, and a chat pane 306. Additional, different, or fewer components may be included.

The contract pane 302 may include a list of contacts. The list of contacts may include a list of devices, usernames, or people that the messaging device 200 or the endpoint device 205 can exchange messages using the versatile message user interface 300. The list of contacts may include devices previously in communication with the messaging device 200 or the endpoint device 205. The list of contacts may include a personal contact list established by the user on an organization. The list of contacts may include contacts authorized or registered to receive the instant messages.

The conversation pane 304 may include a listing of active and/or past conversations. Each entry in the list of active and/or past conservations may include a participant entry, an organization entry, and a time entry. The participant entry may list the username, device identifier, or other identifier for a user or device that participated or is participating in the conversation. The organization entry may list an organization or credential for the user or the device that participated or is participating in the conversation. The time entry may list a timestamp or date stamp for the conversation. The time entry may list the most recent communication in the conversation (e.g., time of most recent instant message). The time entry may list the number of instant messages that make up the conversation.

The chat pane 306 may include instant messages for a current chat. The chat pane 306 may include a text display object 311 corresponding to the text object 211 and an action display object 313 corresponding to the action object 213. The action display object 313 may be include a summary of the object using one or more parameters such as type (e.g., strangle option or STNGL), date (e.g., October 2017), and amounts (e.g., 2.6 Call and 3.9 Put), for a predetermined quantity or a specified quantity. The action display object 313 may be moved (e.g., drag and drop) to other interfaces available to the messaging device 200 or the endpoint device 205. The action object 213 may be executed by the messaging device 200 or the endpoint device 205 to create the the action display object 313. The action object 213 may be executed by the messaging device 200 or the endpoint device 205 using another application to send the order or quote to another device. The action object 213 may be executed by the messaging device 200 or the endpoint device 205 to execute the order or quote. The action object 213 may created using the chat pane 306 be added to the chat pane 306 from another application.

Figure 6:
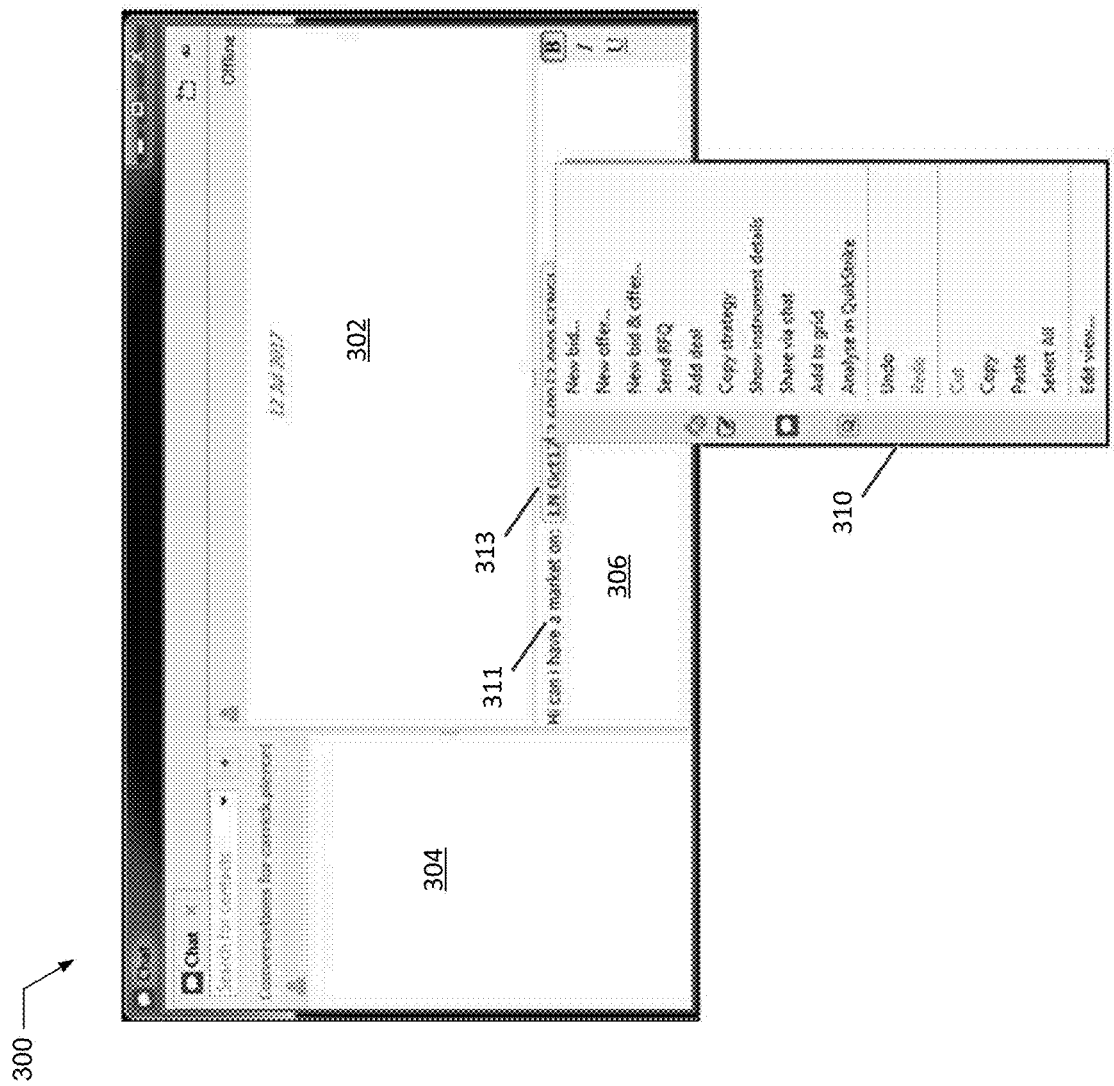
FIG. 6 depicts an illustrative embodiment of data object control in the communication window of FIG. 5.

FIG. 6 depicts an illustrative embodiment of data object control in the communication window of FIG. 5. When the messaging device 200 or the endpoint device 205 displays the action display object 313, a user input may be received selecting the action display object 313 (e.g., click or right click). In response to the user input, the messaging device 200 or the endpoint device 205 may display an action object menu 310. The action object menu 310 may include one or more action object execution commands including create a new bid, create a new offer, simultaneous create new bid and offer, send request for quote, add a deal, copy the strategy of the option object, or transfer to another application. In response to a selection on the action object menu 310, the action object 211 may be executed by an application selected from the action object menu 310. In response to a selection on the action object menu 310, the action object 211 may be modified (e.g., adjust one or more parameters). In response to a selection on the action object menu 310, another action object may be created and/or executed.

Figure 7:
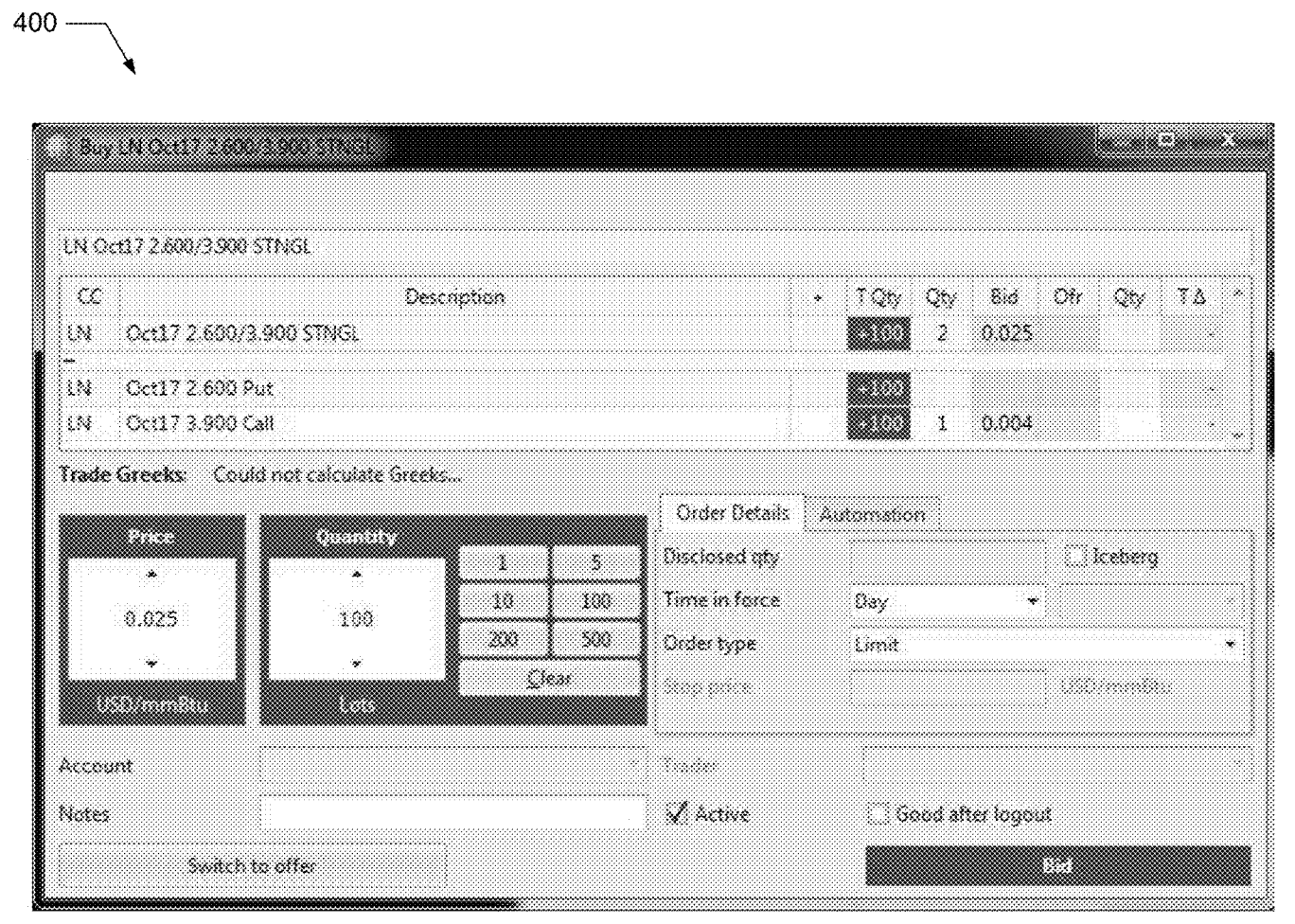

FIG. 7 depicts an illustrative action object interface 400 for an embodiment of data object control in the communication window of FIG. 5. The action object interface 400 may be used to create the action object 213. The action object interface 400 may receive one or more user inputs for selecting a strategy, a quantity, a price, a timing, order type or other parameters for the action object 213. The action object interface 400 may be accessed through opening the action object 213 (e.g., selection of action display object 313). The action object 213 may be modified using the action object interface 400.

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

One exemplary system for matching is described in U.S. patent application Ser. No. 13/534,399, filed on Jun. 27, 2012, entitled "Multiple Trade Matching Algorithms," published as U.S. Patent Application Publication No. 2014/0006243 A1, the entirety of which is incorporated by reference herein and relied upon, discloses an adaptive match engine which draws upon different matching algorithms, e.g., the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine may automatically adapt to the changing market conditions of a financial product, e.g., a limited life product, in a non-preferential manner, maintaining fair order allocation while improving market liquidity, e.g., over the life of the product.

In one implementation, the system may evaluate market conditions on a daily basis and, based thereon, change the matching algorithm between daily trading sessions, i.e., when the market is closed, such that when the market reopens, a new trading algorithm is in effect for the particular product. As will be described, the disclosed embodiments may facilitate more frequent changes to the matching algorithms so as to dynamically adapt to changing market conditions, e.g., intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed embodiments may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as Leg1−2×Leg2+Leg3. Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implication" or "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number component financial instruments involved, and whether those component financial instruments further comprise component financial instruments of their own, there may be numerous implied opportunities, the submission of a counter order in response thereto, would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

For example, two different outright orders may be resting on the books, or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs.

Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradable items, which has the potential of attracting additional traders. Exchanges benefit from increased transaction volume. Transaction volume may also increase as the number of matched trade items increases.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Packets and packet switched networks are used extensively in electronic communications. Packet switched networks utilize a digital networking communications method that groups all transmitted data, regardless of content, type, or structure, into suitably sized blocks, called packets. Generally, packets may contain control information as well as user data, also known as a payload or actual content. Typically, the control information provides data the network needs to deliver the user data such as source and destination network addresses and the user data involves the actual content intended to be communicated between the source and the destination. For example, packets may be considered messages, with the control information providing addresses or information about the actual content of the message included as user data.

Under the Open System Interconnection ("OSI") model, which is a conceptual model that characterizes and standardizes the internal functions of a communication system by partitioning it into abstraction layers, the physical abstraction layer defines electrical and physical specifications for devices. In particular, it defines the relationship between a device and a transmission medium, such as a copper or fiber optical cable. This includes the layout of pins, voltages, line impedance, cable specifications, signal timing, hubs, repeaters, network adapters, host bus adapters (HBA used in storage area networks) and more. The major functions and services performed by the physical layer include: establishment and termination of a connection to a communications medium; participation in the process whereby the communication resources are effectively shared among multiple users, for example, contention resolution and flow control; and modulation or conversion between the representation of digital data in user equipment and the corresponding signals transmitted over a communications channel, these signals operating over the physical cabling (such as copper and optical fiber) or over a radio link.

In a TCP/IP implementation, a source (e.g., client computer) application may provide application layer data to a TCP layer (transport layer), which divides the data into segments and adds a TCP header to the segmented data. The TCP layer passes TCP segments to an IP layer, which adds an IP header to the TCP segments and passes the information/data to the recipient in the form of IP packets communicated over the IP protocol. The IP layer relies on a physical layer which transmit the IP packets in network frames to the recipient. Each layer may add its own header to the data received from another layer. On the recipient side, the physical layer passes IP packets to the IP layer, which passes TCP segments to the TCP (transport) layer, which in turn passes application data to the destination application.

As used herein, electronic message data segments may refer to TCP segments, which may include IP packets. Electronic message packets may refer to IP packets, or may refer generally any division/packeting of data, e.g., for easier/more convenient transmission thereof.

Electronic message packets may be communicated via networks. Generally, a network interconnects one or more computers so that they may communicate with one another, whether they are in the same room or building (such as a Local Area Network or LAN) or across the country from each other (such as a Wide Area Network or WAN). A network is a series of points or nodes interconnected by communications paths. Networks can interconnect with other networks and can contain sub-networks. A node is a connection point, either a redistribution point or an end point, for data transmissions generated between the computers which are connected to the network. In general, a node has a programmed or engineered capability to recognize and process or forward transmissions to other nodes. The nodes can be computer workstations, servers, bridges or other devices but typically, these nodes are routers or switches. Electronic message packets may be communicated from an origin through a series of nodes to an intended final destination.

Further, even as electronic message packets arrive at a destination (e.g., the data transaction processing system), the handling of the electronic message packets at the destination may also involve multiple steps, component interactions, and processes until the message is ultimately received by a destination application for use thereby. This process may be further complicated if multiple electronic message packets from multiple origins are communicated to a common destination application using communication protocols that organize electronic message packets based on origin and/or prioritization rules for processing at the common destination. For example, a communication protocol may indicate that a buffer will be created for each source at the destination, and that electronic message packets from each source will be placed in the respective buffer for each source at the destination. The receiving computer may reassemble the electronic message packets into electronic message data segments, which may in turn be reassembled and provided to a destination application. The destination application may process, consume, or otherwise use the electronic message packet or electronic message data segment payload, and report on the results of the processing, consumption, and/or usage of the messages back to the origin or source of the message. For example, the electronic message packets and/or electronic message data segments may be provided to an order entry gateway in a deterministic manner. For additional information on deterministic processing, see U.S. Pub. No. 2015/0178831, filed on Dec. 19, 2013, entitled "Deterministic And Efficient Message Packet Management", the entirety of which is incorporated by reference herein and relied upon. The order entry gateway may be configured to collect the electronic message packets/segments and provide them to an order book or a match engine for one or more financial instruments. A match engine may then use the electronic message packets and the determined order to match orders represented by the electronic message packets based on a priority determined from the determined order. The communications protocol may provide a transport layer acknowledgement message to the source of an electronic message data segment substantially immediately, e.g., before the electronic message data segment is processed by a destination application. In the process, it may be necessary for the data transaction processing system to generate and associate a unique identification number for each electronic data transaction request message, and provide the identification number to the message source associated with the electronic data transaction request message. In one embodiment, the message source (e.g., client computer) cannot submit additional instructions (e.g., additional electronic data transaction request messages) associated with an initial electronic data transaction request message until the identification number of the initial electronic data transaction request message is provided to the client computer. The disclosed embodiments facilitate efficient processing of electronic message data segments communicated to an application via a network from a plurality of message sources using a communications protocol which generates a transport layer acknowledgement message upon receipt of an electronic message data segment.

Figure 8:
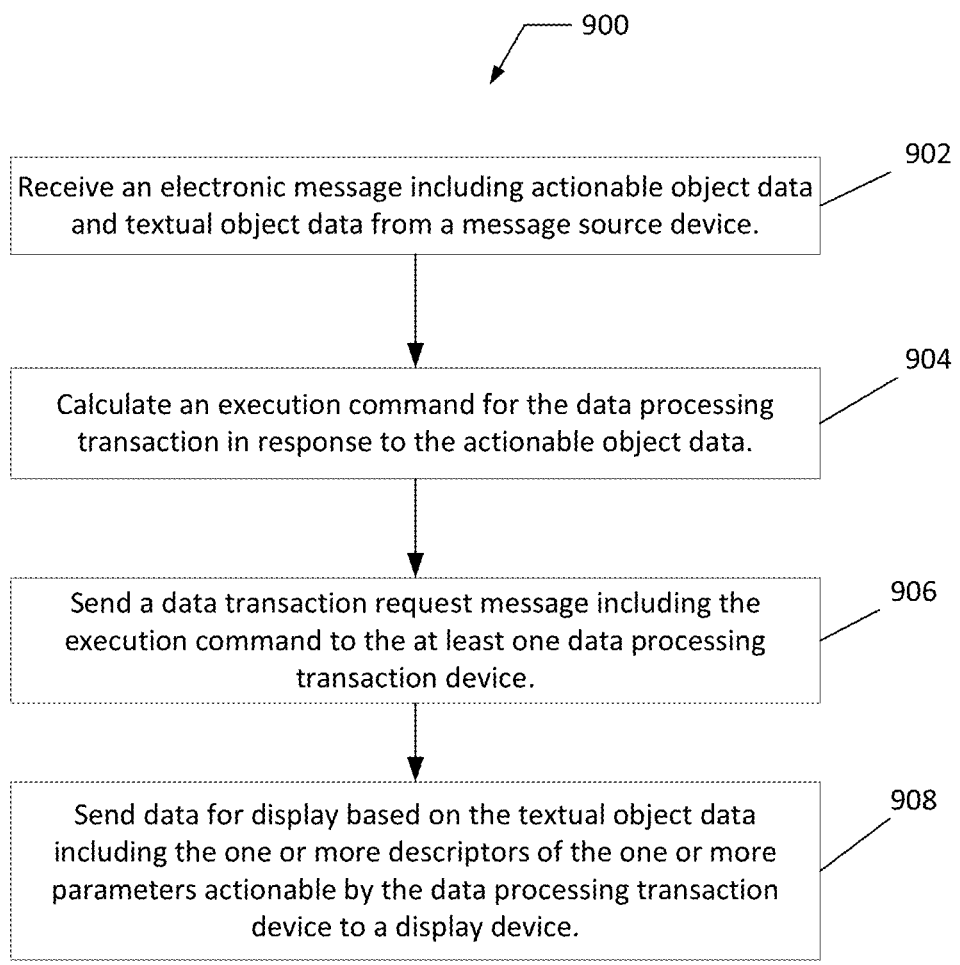
FIG. 8 depicts a flow chart for implementing aspects of the disclosed embodiments.

FIG. 8 illustrates an example computer implemented method for facilitation of efficient processing of a plurality of electronic messages communicated to an application via a network, which may be implemented with computer devices and computer networks, such as those described with respect to FIG. 2. Embodiments may involve all, more or fewer actions indicated by the actions of FIG. 8. The actions may be performed in the order or sequence shown or in a different sequence.

At step 802, a communication interface (e.g., communication interface 218) coupled with a network receives one or more electronic messages from the network that include actionable object data and textual object data from a message source device. The actionable object data including one or more parameters actionable by at least one data processing transaction device to perform one or more data processing transactions external to the network device and the textual object data including one or more descriptors of the one or more parameters actionable by the at least one data processing transaction device, the textual object data operable by devices incompatible with the actionable object data.

The communication interface 218 or the processor 202 are examples of a means for receiving an electronic message including actionable object data and textual object data from a message source device.

At step 804, the processor 202 calculates an execution command for the data processing transaction in response to the actionable object data. The execution command based on at least the one or more parameters of the actionable object data. The processor 202 may execute an executable file included in the instant message, which results in the execution command handled internally by the processor 202 or sent to another device. The processor 202 is a means for calculating the execution command.

At step 806, the communication interface 218 sends a data transaction request message including the execution command to the at least one data processing transaction device. The communication interface 218 or the processor 202 are examples of a means for sending a data transaction request message including the execution command to the at least one data processing transaction device.

At step 808, the bus 208 sends data from the processor 202 to display 214 for display based on the textual object data. The bus 208 or the processor 202 are examples of a means for sending data for display based on the textual object data including the one or more descriptors of the one or more parameters actionable by the data processing transaction device to a display device other than the at least one data processing transaction device. The display 214 is a means for displaying the textual object data.

The speed with which an exchange computing system can receive and process electronic data transaction request messages is important to the success of the exchange computing system. It may be important for the data transaction processing system to process and respond to customers' electronic data transaction request messages as soon as possible. Thus, it may not be desirable to delay processing of electronic data transaction request messages by generating identification numbers before the electronic data transaction request messages are processed (e.g., matched). Moreover, once an identification number is generated, it must be associated with the electronic data transaction request message for the life of the electronic data transaction request message in the exchange computing system. When an identification number is associated with the electronic data transaction request message, the size of the electronic data transaction request message may increase (because it now includes the identification number). Or, the identification number may be stored in a memory, and a pointer to that memory location is then associated with the electronic data transaction request message. Accordingly, to avoid delay of generating identification numbers and complexity of associating identification numbers with electronic data transaction request messages, an exchange computing system may not generate identification numbers until after an electronic data transaction request message enters the match engine (e.g., match component) and has been processed by the match engine. However, this causes customers to have to wait until an electronic data transaction request message is processed to receive its identification number. During this time period, which can vary depending on the state of the exchange computing system and the results of match attempts, customers have no control over their previously submitted orders. For more information on the impact of latency on customers in a data transaction processing system, see U.S. application Ser. No. 15/260,707, entitled "Message Cancellation Based On Data Transaction Processing System Latency", filed Sep. 9, 2016, the entirety of which is incorporated by reference herein and relied upon. As discussed above, identification numbers provide a useful way for traders to control previously submitted orders.

In one embodiment, the disclosed message management module uses hardware level information that is already present and generated in the system (e.g., a timestamp) to quickly and efficiently generate identification numbers without slowing down or delaying processing of electronic data transaction request messages by the exchange computing system. Because the disclosed embodiments allow for rapid generation and TCP level transmission of valid identification numbers, the exchange computing system can balance customer control over messages (via immediately received identification numbers) with the exchange computing system's desire to process electronic data transaction request messages in the match engine as quickly as possible.

Examples of the various types of market data feeds which may be provided by electronic trading systems, such as the CME, in order to provide different types or subsets of market information or to provide such information in different formats include Market By Order or Per Order, Market Depth (also known as Market by Price or Aggregated By Value to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, also known as an Aggregated By Value ("ABV") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed also known as a Per Order ("PO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO/PO messages may carry much more data than MBP/ABV messages because MBO/PO messages reflect information about each order, whereas MBP/ABV messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An ABV book data object may include information about multiple values. The ABV book data object may be arranged and structured so that information about each value is aggregated together. Thus, for a given value V, the ABV book data object may aggregate all the information by value, such as for example, the number of orders having a certain position at value V, the quantity of total orders resting at value V, etc. Thus, the value field may be the key, or may be a unique field, within an ABV book data object. In one embodiment, the value for each entry within the ABV book data object is different. In one embodiment, information in an ABV book data object is presented in a manner such that the value field is the most granular field of information.

A PO book data object may include information about multiple orders. The PO book data object may be arranged and structured so that information about each order is represented. Thus, for a given order O, the PO book data object may provide all of the information for order O. Thus, the order field may be the key, or may be a unique field, within a PO book data object. In one embodiment, the order ID for each entry within the PO book data object is different. In one embodiment, information in a PO book data object is presented in a manner such that the order field is the most granular field of information.

Thus, the PO book data object may include data about unique orders, e.g., all unique resting orders for a product, and the ABV book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP/ABV and MBO/PO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate a PO book object and an ABV book object. It should be appreciated that each book object, or view for a product or market, may be derived from the Per Order book object, which includes all the orders for a given financial product or market.

An inbound message may include an order that affects the PO book object, the ABV book object, or both. An outbound message may include data from one or more of the structures within the exchange computing system, e.g., the PO book object queues or the ABV book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. patent application Ser. No. 14/100,788, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

While the disclosed embodiments will be discussed with respect to an MBP market data feed, it should be appreciated that the disclosed embodiments may also be applicable to an MBO market data feed.

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple markets, and because the electronic trading system includes one MSG for each market/product implemented thereby, the electronic trading system may include multiple MSGs. For more detail on deterministic operation in a trading system, see U.S. patent application Ser. No. 14/074,667 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013, the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. Patent Publication No. 2015/0127516 ("the '516 Publication"), entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for facilitation of efficient processing of electronic messages communicated to an application via a network from one or more message sources, the method comprising:
   receiving, by a network device coupled with the network, an electronic message including actionable object data and textual object data from a message source device, the actionable object data including one or more parameters actionable by at least one data processing transaction device to perform one or more data processing transactions external to the network device and the textual object data including one or more descriptors of the one or more parameters actionable by the at least one data processing transaction device, the textual object data operable by devices incompatible with the actionable object data, wherein the actionable object is not dependent on text of the electronic message;
   calculating, by a processor of the network device, an execution command for the data processing transaction in response to the actionable object data, the execution command based on at least the one or more parameters of the actionable object data;
   sending, by the network device coupled with the network, a data transaction request message including the execution command to the at least one data processing transaction device; and
   sending, by the network device coupled with the network, data for display based on the textual object data including the one or more descriptors of the one or more parameters actionable by the data processing transaction device to a display device other than the at least one data processing transaction device.

2. The computer implemented method of claim 1, wherein the electronic message is an instant message and the textual object data includes at least one freeform word.

3. The computer implemented method of claim 1, further comprising:
   determining, by the processor of the network device, an identification code from the electronic message, the identification code indicative of the message source device.

4. The computer implemented method of claim 3, further comprising:
   selecting the data processing transaction device in response to the identification code.

5. The computer implemented method of claim 3, further comprising:
   generating, by the processor of the network device, a receipt message in response to the electronic message; and
   sending the receipt message to the message source device based on the identification code.

6. The computer implemented method of claim 5, wherein the receipt message includes data indicative of the at least one data processing transaction device in response to the electronic message being sent to the at least one data processing transaction device.

7. The computer implemented method of claim 5, wherein the receipt message includes data indicative of the at least one display device in response to the electronic message being sent to the display device.

8. The computer implemented method of claim 3, further comprising:
   selecting, by the processor of the network device, an intermediary device in response to the identification code, wherein the actionable object data is sent to the intermediary device.

9. The computer implemented method of claim 8, wherein the intermediary device is configured to perform a security check on the electronic message.

10. The computer implemented method of claim 1, wherein the intermediary device is configured to perform a verification for a sender of the electronic message.

11. The computer implemented method of claim 1, wherein the at least one data processing transaction device includes a plurality of devices each configured to communicate on one of a plurality of platforms.

12. The computer implemented method of claim 1, further comprising:
    modifying, by the processor of the network device, the one or more parameters actionable by the at least one data processing transaction device.

13. The computer implemented method of claim 12, wherein the one or more parameters actionable by the at least one data processing transaction device are modified based on a user input.

14. The computer implemented method of claim 1, further comprising:
    querying a lookup table for a compatibility of the network device with actionable object data; and
    wherein the execution command for the data processing transaction is based on the compatibility of the network device with the actionable object data.

15. The computer implemented method of claim 1, further comprising:
    adding additional textual object data to the instant message in response to a user input.

16. An apparatus comprising:
    a communication interface configured to receive an electronic message including actionable object data and textual object data from a message source device, the actionable object data including one or more parameters actionable by at least one data processing transaction device to perform one or more data processing transactions external to the network device and the textual object data including one or more descriptors of the one or more parameters actionable by the at least one data processing transaction device, the textual object data operable by devices incompatible with the actionable object data, wherein the actionable object data is not dependent on text of the electronic message;
    a processor configured to calculate an execution command for the data processing transaction in response to the actionable object data, the execution command based on at least the one or more parameters of the actionable object data, the processor further configured to generate a data transaction request message including the execution command to the at least one data processing transaction device and generate data for display based on the textual object data including the one or more descriptors of the one or more parameters actionable by the data processing transaction device to a display device other than the at least one data processing transaction device.

17. A system for facilitation of efficient processing of instant messages communicated to an application via a network from message sources, the system comprising:
    at least one memory operable to store the instant messages;
    at least one processor configured to cause the system to:

identify an instant message including actionable object data and textual object data from a message source device, the actionable object data including one or more parameters actionable by at least one data processing transaction device to perform one or more data processing transactions and the textual object data including one or more descriptors of the one or more parameters actionable by the at least one data processing transaction device, the textual object data operable by devices incompatible with the actionable object data, wherein the actionable object data is not dependent on text of the instant message;

calculate an execution command for the data processing transaction in response to the actionable object data, the execution command based on at least the one or more parameters of the actionable object data;

send a data transaction request message including the execution command to the at least one data processing transaction device; and send data for display based on the textual object data including the one or more descriptors of the one or more parameters actionable by the data processing transaction device to a display device other than the at least one data processing transaction device.

18. The system of claim 17, wherein the textual object data includes at least one freeform word.

19. A system for facilitation of efficient processing of electronic messages communicated to an application via a network from message sources, the system comprising:

a first logic stored in a memory and configured to be executed by a processor of a network interface coupled with the network to cause the system to receive an electronic message including actionable object data and textual object data from a message source device, the actionable object data including one or more parameters actionable by at least one data processing transaction device to perform one or more data processing transactions external to the network device and the textual object data including one or more descriptors of the one or more parameters actionable by the at least one data processing transaction device, the textual object data operable by devices incompatible with the actionable object data, wherein the actionable object data is not dependent on text of the electronic message;

a second logic stored in a memory and configured to be executed by a processor of a network interface coupled with the network to cause the system to calculate an execution command for the data processing transaction in response to the actionable object data, the execution command based on at least the one or more parameters of the actionable object data;

a third logic stored in a memory and configured to be executed by a processor of a network interface coupled with the network to cause the system to send a data transaction request message including the execution command to the at least one data processing transaction device; and a fourth logic stored in a memory and configured to be executed by a processor of a network interface coupled with the network to cause the system to send data for display based on the textual object data including the one or more descriptors of the one or more parameters actionable by the data processing transaction device to a display device other than the at least one data processing transaction device.

20. An apparatus comprising:

means for receiving an electronic message including actionable object data and textual object data from a message source device, the actionable object data including one or more parameters actionable by at least one data processing transaction device to perform one or more data processing transactions external to the network device and the textual object data including one or more descriptors of the one or more parameters actionable by the at least one data processing transaction device, the textual object data operable by devices incompatible with the actionable object data and the actionable object data not being dependent on text of the electronic message;

means for calculating an execution command for the data processing transaction in response to the actionable object data, the execution command based on at least the one or more parameters of the actionable object data;

means for sending a data transaction request message including the execution command to the at least one data processing transaction device; and means for sending data for display based on the textual object data including the one or more descriptors of the one or more parameters actionable by the data processing transaction device to a display device other than the at least one data processing transaction device.

* * * * *